3,426,009
MANUFACTURE OF ORGANIC FLUORINE
COMPOUNDS
James Chapman and David Christopher Horner, Widnes, England, assignors to Imperial Chemical Industries Limited, London, England, a corporation of Great Britain
No Drawing. Continuation of application Ser. No. 286,950, June 11, 1963. This application Oct. 27, 1967, Ser. No. 678,765
Claims priority, application Great Britain, June 13, 1962, 22,695/62
U.S. Cl. 260—653.7     4 Claims
Int. Cl. C07c *17/20*

ABSTRACT OF THE DISCLOSURE

This invention is directed to the manufacture of chlorofluoroalkanes which comprises reacting in the vapor phase compounds selected from the group consisting of fully chlorinated alkanes and fully chlorinated alkenes containing not more than 2 carbon atoms with hydrogen fluoride in the presence of black chromium fluoride catalyst, said catalyst being prepared by heating a member of the group consisting of chromic hydroxide and chromium trioxide in the presence of molecular oxygen at approximately 300° C. to 370° C.

---

This case is a continuation of application Ser. No. 286,950 filed June 11, 1963, and now abandoned.

This invention relates to an improved process for the manufacture of chlorofluorohydrocarbon when using an improved chromium oxide catalyst.

Chromium oxides of various compositions such as those corresponding to the formulae $CrO_3$, $Cr_3O_8$, $Cr_2O_5$, $CrO_2$, and $Cr_2O_3$ are known as such. It is also known that chromium trioxide ($CrO_3$) can be decomposed on heating into various proportions of the lower oxides and that by heating under high oxygen pressures the decomposition can be controlled to give particular oxides.

We have now found that black chromium oxides with atomic ratios of oxygen to chromium of greater than 1.5:1 but less than 3:1 are eminently useful as catalysts in the vapour phase fluorination of organic compounds.

According to the present invention we claim a process for the manufacture of chlorofluoroalkanes which comprises reacting in the vapour phase a fully chlorinated alkane or a fully chlorinated alkene containing not more than two carbon atoms with hydrogen fluoride in the presence of a black chromium oxide catalyst, wherein the atomic ratios of oxygen to chromium are greater than 1.5:1 but less than 3:1, the reaction being carried out in the presence of chlorine when the organic reactant is fully chlorintaed alkene.

The green chromium oxides do have some activity as catalysts in the vapour phase fluorination of said alkanes or alkenes but are not by any means as effective in the present reaction as the black variety. Thus under the optimum reaction conditions for conversion to highly fluorinated chloroalkanes the yield of the latter compounds is lower when using the less active green chromium oxide than when using the more active black chromium oxide catalyst of the present invention. When using similar reaction conditions similar yields of said compounds can be obtained with the present catalysts when employing less stringent conditions for example temperature conditions than with the less active green chromium oxide catalysts. The green chromium oxides are generally of the formula $Cr_2O_3$ while the black chromium oxides have an atomic ratio of oxygen to chromium greater than 1.5:1 but less than 3:1.

The black chromium oxides may be prepared according to any appropriate method for use in the present invention. Thus they may be prepared by heating chromium trioxide, chromic hydroxide, chromic carbonate or any other readily decomposable salt of chromium in air or oxygen. Care should be taken however in the latter preparations that the chromic salt is not heated to such a high temperature as to produce the green rather than the black variety of the chromic oxide. Thus, chromium trioxide on heating in air at 300° C. to 370° C. will yield the black oxide. Likewise chromic hydroxide on heating in air at 350° C. will yield the black variety. On the contrary on heating chromic hydroxide to 450° C. the green chromium oxide is produced and this is especially liable to occur if the chromium hydroxide is supported on γ-alumina and is then heated to 450° C. In use the present chromium oxide catalysts may take up small and variable proportions of fluorine. This does not appear to affect the catalytic activity of the oxides significantly, however, and offers no advantage. A very useful black chromium oxide catalyst is one which is prepared by taking a black chromium oxide catalyst, say prepared by heat treatment of chromium hydroxide and heating this material in the presence of hydrogen, then heating in the presence of oxygen and repeating the process several times, the last procedure always being heating in the presence of oxygen.

The catalysts may be compresed into pellets and the incorporation of a small proportion of a lubricating material such as graphite assists in the pelleting procedure. The pellets may be compressed at a pressure of as high as 10 tons/sq. in. or even higher but lower pressures for example pressures of the order of 2 tons/sq. in. are preferred since this presents a greater surface area of catalyst to the incoming feed.

The products of the present invention are $CFCl_3$, $CF_2Cl_2$, $CF_3Cl$ and $CF_4$ when the organic reactant is carbon tetrachloride. When the reactant is perchloroethylene (in the presence of chlorine) the products are essentially 1:2-dichloro-1:1:2:2 tetrafluoroethane ($CF_2Cl.CF_2Cl$) and pentafluorochloroethane ($C_2F_5Cl$).

The temperatures employed in the present invention depend on the chlorinated compound to be reacted, the particular catalyst used and the particular products to be desired. When the organic reactant is carbon tetrachloride temperatures in the range 175° C. to 425° C. are generally employed. Thus when using a black chromium oxide catalyst derived by heating $CrO_3$ at 300° C. in air and utilising a temperature in the range 200° C. to 225° C. the products are essentially $CFCl_3$ and $CF_2Cl_2$. Again when using a more active catalyst derived by heating $Cr(OH)_3$ at 350° C. in air and utilising a reaction temperature in the range 275 to 425° C. the products are essentially $CF_3Cl$ and $CF_4$. Again when using a particularly active catalyst derived by heating the last mentioned catalyst alternatively with hydrogen and oxygen but utilising comparatively low reaction temperatures in the range 175° C. to 225° C. the products are essentially $CF_2Cl_2$ and $CF_3Cl$. When the perchloroethylene, chlorine and HF are the reactants temperatures in the range 275° C. to 475° C. are generally employed. Thus when using the black chromium oxide catalyst derived by heating $Cr(OH)_3$ at 350° C. in air and utilising a reaction temperature in the range 275° C. to 325° C. the reaction products are essentially pentafluorochloroethane with a smaller amount of 1:1:2:2-tetrafluoro 1:2-dichloroethane. When using higher temperatures in the range 325° C. to 375° C. with these catalyst increasing amounts of pentafluorocholoethane towards the tetrafluorodichloroethane as formed. Again with the particularly active catalyst derived by the alternate heating with hydrogen and oxygen at comparatively low temperatures in the range 275° C. to 325° C. large amounts of pentafluorochloroethane towards tetrafluorodichloroethane can still be obtained. Of course other variables such as contact time and molar proportions of HF/organic reactant also have their effect. Generally with larger contact times, high HF/organic reactant molar ratio and increased temperatures give greater yield of the more highly fluorinated products. In these reactions the molar ratios of chlorine/perchloroethylene one usually at least 0.8:1. Generally not more than 1.8 moles of chlorine are employed per mole of perchloroethylene.

The following examples illustrate but do not limit the invention.

EXAMPLE 1

Chromium hydroxide $(Cr(OH)_3 \cdot H_2O)$ was heated in a muffle furnace at 350° C. for 3 hours to yield a fine black amorphous powder in which the ratio of oxygen to chromium atoms was approximately 1.8:1.

The powder was admixed with 2% of water and made into pellets using a compacting pressure of 10 tons/sq. in. After drying, the pellets were ground into particles of 8 to 12 mesh (British Standard Specification). The width of the apertures and wires of the 8-mesh sieve were 2 mm. and .39 mm., respectively and the width of the apertures and wires of the 12-mesh sieve were 1.4 mm. and .28 mm., respectively.

The particles were loaded into a vertical nickel reaction tube and were purged with anhydrous hydrogen fluoride at a temperature of 450° C. A mixture of the reactants was preheated and passed into the lower end of the vertical nickel reaction tube which was of 1 inch internal diameter and 44 inches long, the volume of the catalyst used being dependent on the contact time desired. Over a period of 6 hours, a mixture of 225 g. of perchloroethylene, 147 g. of anhydrous hydrogen fluoride and 107 g. of chlorine was passed over the catalyst at a contact time of 12.2 secs. and the said temperature of 450° C.

2 g. of unreacted perchloroethylene were recovered and of the perchloroethylene consumed 65% was converted to $C_2F_5Cl$, 5% to $CF_2Cl \cdot CF_2Cl$, 15% to $CF_3 \cdot CFCl_2$ and 3.6% to $CF_3 \cdot CCl_3$. Other amounts of lower fluorinated compounds were also produced.

EXAMPLE 2

A technical grade chromium trioxide (99.5% $CrO_3$, 0.001% chloride, 0.05% sulphate, 0.005% iron and 0.2% alkalies) was heated at 300° C. for 12 hours. The fused black mass was ground to a fine amorphous powder, mixed with 2% of water and made into pellets using a compacting pressure of 10 tons/sq. in. After drying the pellets were ground into particles of size 8–12 mesh (B.S.S.) as described in Example 1. The empirical formula of the product was $Cr_2O_5$.

The particles were loaded into the nickel tube and purged with anhydrous hydrogen fluoride at a temperature of 350° C. Then, over a period of 330 minutes, and utilising the procedure of Example 1 a mixture of 162 g. of perchloroethylene, 122 g. of chlorine and 113 g. of anhydrous hydrogen fluoride was passed over the catalyst at a contact time of 13.9 secs. and at the said temperature of 350° C.

15 g. of perchloroethylene were recovered and, of the perchloroethylene consumed, 53% was converted to $CF_2Cl \cdot CF_2Cl$, 8.4% to $CF_3 \cdot CCl_2F$, 6.6% to $CF_3 \cdot CF_2Cl$ and 2.7% to $CF_3 \cdot CCl_3$. Other amounts of lower fluorinated compounds were also produced.

EXAMPLE 3

The fine black powdered catalyst produced as in Example 1 was pelleted in a pelleting machine using a 3/16 inch die and a compacting pressure of 2 tons/sq. in.

The pellets were loaded into a 1 inch internal diameter nickel tube and were purged with anhydrous hydrogen fluoride at a temperature of 350° C. Various amounts of perchloroethylene, chlorine and hydrogen fluoride were passed over the catalyst under various reaction conditions. The results are tabulated hereinafter.

| Run No. | $HF/C_2Cl_4$ molar | $Cl_2/C_2Cl_4$ molar | Contact Time, secs. | Temp., °C. | Percent yield on $C_2Cl_4$ reacted | | | | |
|---|---|---|---|---|---|---|---|---|---|
| | | | | | $CF_3CF_3$ | $CF_3 \cdot CF_2Cl$ | $CF_2ClCF_2Cl$ | $CF_3CFCl_2$ | $CF_3 \cdot CCl_3$ |
| 1 | 4.78 | 1.17 | 4.38 | 350 | 5.8 | 51.3 | 5.1 | 7.4 | 3.6 |
| 2 | 3.96 | 1.01 | 5.08 | 350 | 1.4 | 47.8 | 8.3 | 24.0 | 5.3 |
| 3 | 5.80 | 1.40 | 3.63 | 350 | 2.8 | 42.3 | 14.6 | 16.9 | 16.9 |
| 4 | 3.96 | 0.95 | 3.16 | 350 | 3.5 | 32.5 | 5.4 | 9.7 | 5.4 |

Comparison

By way of comparison a green chromium oxide catalyst was prepared and utilised in the reaction of perchloroethylene, chlorine and HF.

Water (1145 milliliters) and ammonium hydroxide (588 grams, 28% $NH_3$) were placed in a flask equipped with a mechanical stirrer and a dropping funnel. A chromic chloride solution (520 grams of a 37% chromic chloride solution and one liter of water) was added dropwise to the contents of the flask with stirring during a one-hour period. The resulting precipitate was separated from the supernatant liquid, and the precipitate was washed with water to remove ammonium chloride. The precipitate was then placed in a shallow pan and dried in a vacuum oven at 70° C. When the material was partially dried the paste was cut into small squares so that the hydrous chromium oxide catalyst after complete drying was in the form of 6.4 mm. cubes. The final drying of the hydrous chromium oxide catalyst was accomplished at a temperature of 480° C. under an atmosphere of nitrogen.

This run was carried out (Run 5) with a contact time of 2.74 secs. and a reaction temperature of 360° C. The results are tabulated hereinafter.

$HF/C_2Cl_4$ molar _____ 4.95
$Cl_2/Cl_2Cl_4$ molar _____ 1.08
Percent yield on $C_2Cl_4$ reacted:
   $CF_3CF_3$ _____ 0
   $CF_3 \cdot CF_2Cl$ _____ 1.1
   $CF_2ClCF_2Cl$ _____ 23.3
   $CF_3CFCl_2$ _____ 9.0
   $CF_3CCl_3$ _____ 0.7

Run 5 more nearly approaches Run 4 (than Runs 1, 2 and 3) in reaction conditions and will therefore serve by way of comparison. Despite the fact that the molar ratio of $HF/C_2Cl_4$ was greater in Run 5 than Run 4 (and although the contact time was shorter in Run 4 than Run 5) the results show that when using the black chromium oxide the yield of pentafluorochloroethane on $C_2Cl_4$ reacted is for greater at 32.5% than is the yield for said compound (1.1%) when using a green chromium oxide catalyst.

EXAMPLE 4

This example was carried out to illustrate the high yields of 1:1:2:2-tetrafluoro-1:2-dichloroethane obtained with the catalyst of Example 3 when using lower reaction temperatures of 300° C. and that useful yields of pentafluorochloroethane were also produced.

The Runs 6 and 7 were both carried out at a reaction temperature of 300° C. and with contact times of 3.81 secs. and 7.8 secs. respectively. These results (Run 6 first) are tabulated hereinafter.

| HF/C$_2$Cl$_4$ molar | Cl$_2$C$_2$Cl$_4$ molar | Percent yield on C$_2$Cl$_4$ reacted | | | |
|---|---|---|---|---|---|
| | | CF$_3$CF$_2$Cl | CF$_2$ClCF$_2$Cl | CF$_3$CFCl$_2$ | CF$_3$CCl$_3$ |
| 7.0 | 1.55 | 11.2 | 58.0 | 6.5 | 0.9 |
| 5.37 | 1.21 | 8.2 | 42.9 | 7.4 | 5.8 |

EXAMPLE 5

This example was carried out to illustrate even with our Examples 3 and 4 that improved yields of CF$_3$CF$_2$Cl and as high yields of CF$_2$Cl·CF$_2$Cl can be obtained when using an improved black chromium oxide catalyst. The latter was prepared by heating the catalyst of Example 4 first with hydrogen at 450° C. for a period of ½ hour then with oxygen at 450° C. for ½ hour. The heating with hydrogen followed by oxygen was repeated four more times. These Runs 8 and 9 were both carried out at a reaction temperature of 300° C. and with contact times of 4.2 secs. and 4.4 secs. respectively. These results (Run 8 first) are tabulated below.

| HF/C$_2$Cl$_4$ molar | Cl$_2$/C$_2$Cl$_4$ molar | Percent yield on C$_2$Cl$_4$ reacted | | | | |
|---|---|---|---|---|---|---|
| | | CF$_3$CF$_3$ | CF$_3$.CF$_2$Cl | CF$_2$ClCF$_2$Cl | CF$_2$CFCl$_2$ | CF$_3$CCl$_3$ |
| 7.5 | 1.3 | 3.3 | 48.3 | 17.7 | 13.3 | 2.4 |
| 5.6 | 1.1 | 0 | 20.1 | 52.3 | 8.6 | 1.6 |

EXAMPLE 6

An analytical grade of chromium trioxide (CrO$_3$) was heated to 370° C. in an autoclave; the maximum pressure reached was 800 lb. per square inch. The black chromium oxide so produced (oxygen:chromium ratio 2.7:1, and shown by X-ray analyses to be largely a mixture of Cr$_2$O$_5$ and Cr$_3$O$_8$) was compacted with 2% of water using a pressure of 10 tons/sq. in., dried and broken up into granules of 8–12 mesh size. (B.S.S.)

The granules (250 ml.) were loaded into a 1 inch diameter nickel tube and saturated with anhydrous hydrogen fluoride at 210° C. Over a period of 125 minutes, a mixture of 62 g. of carbon tetrachloride and 64 g. of anhydrous hydrogen fluoride was passed over the catalyst bed. 32.1% of the carbon tetrachloride was converted to trichloromonofluoromethane, 64% was converted to dichlorodifluoromethane, and 2.4% was converted to monochlorotrifluoromethane.

EXAMPLE 7

300 ml. of a chromium oxide catalyst made from chromium hydroxide, as described in Example 2, were placed in a 1 inch diameter nickel reaction tube and saturated with hydrogen fluoride at the temperature selected for the reaction.

The results obtained are summarised in the following table.

| | I | II |
|---|---|---|
| Period of reaction (minutes) | 210 | 280 |
| Anhydrous hydrogen fluoride fed (g.) | 85 | 117 |
| Carbon tetrachloride fed (g.) | 115 | 145 |
| Reaction temperature (° C.) | 280 | 400 |
| Conversion of carbon tetrachloride: | | |
| (a) to carbon tetrafluoride (percent) | 1.3 | 96.5 |
| (b) to trifluorochloromethane (percent) | 98.5 | 1.0 |

EXAMPLE 8

This example was carried out with the catalyst described in Example 5. The results are tabulated below HF/CCl$_4$ molar ratio _____ 3.9
Temp., ° C. _____ 200
Contact time, secs. _____ 7.2

Percent yield on CCl$_4$ reacted:
CF$_3$CL _____ 7.8
CF$_2$Cl$_2$ _____ 25.4
CF$_3$Cl _____ 53.0

We claim:
1. A process for the manufacture of chlorofluoroalkanes which comprises reacting in the vapor phase an organic compound selected from the group consisting of a fully chlorinated alkane and fully chlorinated alkene containing not more than 2 carbon atoms with hydrogen fluoride in the presence of a black chromium oxide catalyst wherein the atmoic ratios of oxygen to chromium are greater than 1.5:1 but less than 3:1, said catalyst being prepared by heating a member of the group consisting of chromic hydroxide and chromium trioxide in the presence of molecular oxygen at approximately 300° C. to 370° C., the reaction being carried out in the presence of chlorine when the organic compound is a fully chlorinated alkene.

2. A process for the manufacture of chlorofluoroalkanes according to claim 1 which comprises reacting in the vapor phase an organic compound selected from the group consisting of a fully chlorinated alkane and fully chlorinated alkene containing not more than 2 carbon atoms with hydrogen fluoride in the presence of a black chromium oxide catalyst wherein the atomic ratios of oxygen to chromium are greater than 1.5:1 but less than 3:1, said catalyst being prepared by heating chromium trioxide in air at approximately 300° C., the reaction being carried out in the presence of chlorine when the organic compound is a fully chlorinated alkene.

3. A process for the manufacture of chlorofluoroalkanes according to claim 1 which comprises reacting in the vapor phase an organic compound selected from the group consisting of a fully chlorinated alkane and fully chlorinated alkene containing not more than 2 carbon atoms with hydrogen fluoride in the presence of a black chromium oxide catalyst wherein the atomic ratios of oxygen to chromium are greater than 1.5:1 but less than 3:1, said catalyst being prepared by heating chromic hydroxide in air at approximately 350° C., the reaction being carried out in the presence of chlorine when the organic compound is a fully chlorinated alkene.

4. A process as claimed in claim 3 in which the black chromium oxide catalyst is one which is further heated at approximately 450° C., with hydrogen, then heated with oxygen at approximately 450° C., the process of heating with hydrogen then with oxygen being repeated on a plurality of occasions.

References Cited

UNITED STATES PATENTS 2,110,369 3/1938 Leicester.
2,436,143 2/1948 Hoehn.
2,544,771 3/1951 Young et al.
2,987,487 6/1961 Stevens et al.
3,157,707 11/1964 Clark et al.

DANIEL D. HORWITZ, *Primary Examiner.*

U.S. Cl. X.R.

252—467